(12) United States Patent
Rui et al.

(10) Patent No.: US 12,624,275 B1
(45) Date of Patent: May 12, 2026

(54) TEMPERATURE-RESISTANT AND SALT-TOLERANT IN-SITU PLUGGING ENHANCED GEL COMPOSITIONS, GELS, PREPARATION METHODS AND APPLICATIONS

(71) Applicant: China University of Petroleum-Beijing, Beijing (CN)

(72) Inventors: Zhenhua Rui, Beijing (CN); Yang Zhao, Beijing (CN); Jun Ni, Beijing (CN); Xin Wen, Beijing (CN); Liu Yang, Beijing (CN); Youwei He, Beijing (CN); Jirui Zou, Beijing (CN); Fengyuan Zhang, Beijing (CN); Ting Hu, Beijing (CN)

(73) Assignee: China University of Petroleum-Beijing, Beijing (CN)

( * ) Notice: Subject to any disclaimer, the term of this patent is extended or adjusted under 35 U.S.C. 154(b) by 0 days.

(21) Appl. No.: 19/406,974

(22) Filed: Dec. 3, 2025

(30) Foreign Application Priority Data

Jul. 24, 2025 (CN) ......................... 202511028929.X

(51) Int. Cl.
*E21B 43/34* (2006.01)
*C09K 8/508* (2006.01)
*C09K 8/512* (2006.01)

(52) U.S. Cl.
CPC ............ *C09K 8/512* (2013.01); *C09K 8/5083* (2013.01); *C09K 2208/10* (2013.01)

(58) Field of Classification Search
CPC ................................ C09K 8/512; E21B 43/34
(Continued)

(56) References Cited

U.S. PATENT DOCUMENTS 7,989,401 B2 * 8/2011 Kurian ................... C09K 8/588
507/224
11,034,882 B2 * 6/2021 Del Gaudio ............. C09K 8/58
(Continued)

FOREIGN PATENT DOCUMENTS

CN 102369254 A 3/2012
CN 105504158 A 4/2016
(Continued)

OTHER PUBLICATIONS

Deng Jia'nan, et al., Development and performance evaluation of CO,-responsive preformed particle gel, Special Oil & Gas Reservoirs, 2025, pp. 110-116, vol. 32 No. 2.
(Continued)

*Primary Examiner* — William D Hutton, Jr.
*Assistant Examiner* — Ashish K Varma
(74) *Attorney, Agent, or Firm* — Bayramoglu Law Offices LLC

(57) ABSTRACT

A temperature-resistant and salt-tolerant in-situ plugging-enhanced gel composition, a gel, and their preparation method and application are provided. The gel composition includes a first monomer, a second monomer, a first crosslinking agent, a second crosslinking agent, an initiator, an enhancer, and water; optionally, the composition further includes a third monomer. The gel can undergo re-crosslinking under stimulation by high temperature and $CO_2$-acidic conditions to form the bulk gel, thereby avoiding issues associated with in-situ gel systems such as crosslinking uncertainty, chromatographic separation, and susceptibility to reservoir damage, while simultaneously achieving enhanced plugging capability under in-situ reservoir conditions.

16 Claims, 2 Drawing Sheets

(58) Field of Classification Search
USPC .......................................................... 166/295
See application file for complete search history.

(56) References Cited

U.S. PATENT DOCUMENTS

| | | | |
|---|---|---|---|
| 2016/0069153 A1* | 3/2016 | Luo .......................... | C09K 8/44 |
| | | | 166/293 |
| 2017/0107422 A1 | 4/2017 | Hou et al. | |
| 2020/0071601 A1 | 3/2020 | Long et al. | |
| 2021/0087453 A1* | 3/2021 | Bai ......................... | C09K 8/512 |

FOREIGN PATENT DOCUMENTS

| | | |
|---|---|---|
| CN | 112839994 A | 5/2021 |
| CN | 113549434 A | 10/2021 |
| CN | 116023917 A | 4/2023 |
| CN | 119529180 A | 2/2025 |
| JP | 2014101414 A | 6/2014 |

OTHER PUBLICATIONS

Lizhu Wang, et al., Highly Deformable Nano-Cross-Linker-Bridged Nanocomposite Hydrogels for Water Management of Oil Recovery, Energy Fuels, 2018, pp. 3068-3076, vol. 32.

* cited by examiner

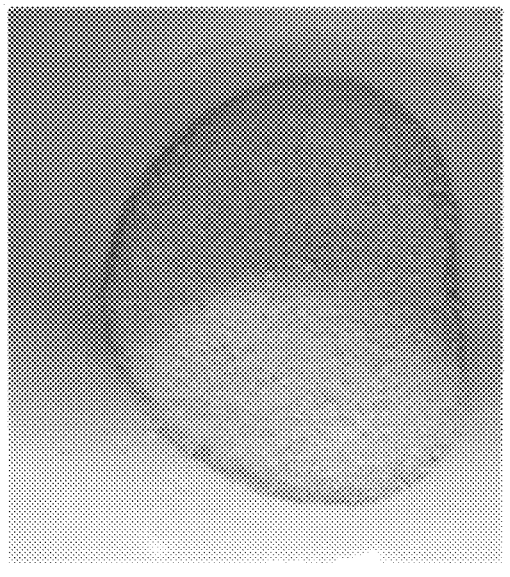
2-the crushed gel particles
FIG. 1
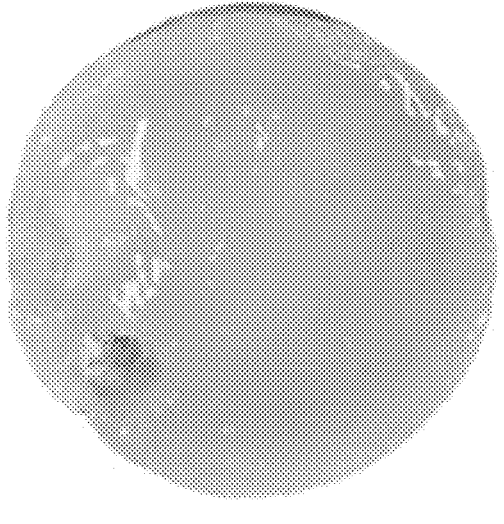
1-the bulk integral gel

TEMPERATURE-RESISTANT AND SALT-TOLERANT IN-SITU PLUGGING ENHANCED GEL COMPOSITIONS, GELS, PREPARATION METHODS AND APPLICATIONS

CROSS REFERENCE TO THE RELATED APPLICATIONS

This application is based upon and claims priority to Chinese Patent Application No. 202511028929.X, filed on Jul. 24, 2025, the entire contents of which are incorporated herein by reference.

TECHNICAL FIELD

This invention relates to the field of oilfield chemical technology, and specifically to a temperature-resistant and salt-tolerant in-situ plugging enhanced gel composition, the gel, as well as its preparation method and application.

BACKGROUND

Geological resources such as crude oil, natural gas, natural gas hydrates, and geothermal fluids are all stored in underground reservoirs. To achieve efficient development, it is necessary to inject fluids (water, $CO_2$, steam, polymer solutions, etc.) into the ground to supplement formation energy, thereby extracting these resources from the underground. In addition, underground space utilization technologies such as carbon sequestration and gas storage also require injecting fluids into underground reservoirs to achieve stable storage of fluids. The prerequisite for the successful application of the above technologies is that the injected fluids can achieve balanced migration and distribution within the reservoirs.

However, geological reservoirs often exhibit strong heterogeneity due to the influence of multiple factors such as sedimentation, tectonism, diagenesis, and fluids. After fluids are injected into the ground, they are prone to channeling, leakage, and other phenomena along faults, natural fractures, artificial fractures, micro-fractures, and high-permeability layers. This has become a key factor restricting the efficient development of geological energy and the safe utilization of underground space.

To address the above-mentioned issues of fluid channeling and leakage, the use of gels to plug channeling and leakage paths has long been regarded as an economical and effective method to reduce reservoir heterogeneity. Underground crosslinking systems are widely used channeling-plugging systems in oilfield sites. Typically, polymers, crosslinking agents, and other chemical agents are formulated into gel-forming solutions, which are then injected into the ground. These solutions form gels at a certain temperature in the formation, thereby plugging the formation.

Nevertheless, such gels often face uncertainties during the gel-forming process, resulting in poor plugging performance. On one hand, after being injected into the ground, the gel-forming solution tends to enter non-target layers, and gel formation in these layers causes damage to the reservoir. On the other hand, when the gel-forming solution passes through the porous media of the formation, the different interactions between various components in the solution and the rock surface lead to differences in migration rates. This phenomenon of chromatographic separation affects the subsequent gel-forming performance of the gel system.

Different from the above-mentioned channeling-plugging systems, pre-crosslinked particle gel systems are prepared by forming gels on the ground first, then processing them into gel particles. These gel particles are formulated into suspensions and injected into the ground, which avoids the uncertainties of gel-forming reactions under formation conditions. At present, a variety of particle gel channeling-plugging systems have been proposed at home and abroad in an attempt to solve the problem of formation heterogeneity.

CN116023917A discloses a $CO_2$-responsive gel system, its preparation method, and a method for preventing $CO_2$ leakage in oil reservoirs. This system has low viscosity in the absence of $CO_2$, making it easy to inject. After reacting with $CO_2$, it forms a gel structure crosslinked by carbamates, achieving the effect of plugging $CO_2$. During $CO_2$ flooding or sequestration processes, injecting the $CO_2$-responsive gel into formations that have leaked or are prone to leakage can effectively prevent and control $CO_2$ leakage in oil reservoirs.

CN119529180A discloses a dual-network $CO_2$-responsive particle gel and its application method. The components of this system include 15%-20% acrylamide, 5%-10% zwitterionic monomer, 5%-10% $CO_2$-responsive monomer, 0.25%-1% emulsifier, 0.05%-0.25% crosslinking agent, 0.075%-0.15% initiator, and the balance being water. Among them, the $CO_2$-responsive monomer is composed of vinylpyridine and N,N-dimethylaminoethyl methacrylate at a mass ratio of (0.5-1):1. Subsequent laboratory core flooding experiments showed that when $CO_2$ flooding was conducted in a core with a temperature of 60° C., a salinity of 10% in mineralized water, and a fracture width of 0.3 mm, the plugging rate of the gel particles reached 99.0%.

CN105504158A discloses an intelligent gel particle capable of re-crosslinking under formation conditions and its preparation method. After entering the formation, these gel particles can re-crosslink with each other under formation conditions to form a high-strength gel, achieving effective plugging. They are mainly used to solve problems such as profile control and water plugging in oilfields, filtration loss control, and leakage plugging during drilling and well completion processes.

CN112839994A discloses a re-crosslinkable particle gel for controlling $CO_2$ conformance and preventing $CO_2$ leakage. This technology provides a $CO_2$-resistant particle gel that can re-crosslink under underground conditions, which is used to improve the conformance of $CO_2$ flow and control $CO_2$ leakage.

The above technical solutions have certain potential to solve fluid channeling and leakage problems. However, projects such as oil and gas exploitation, gas storage, and $CO_2$ flooding and sequestration often develop high-permeability fractured-vuggy zones and other strong channeling paths. Although traditional particle gels can reduce the permeability of high-permeability zones, fractures, and large pores, they are limited by the matching relationship between their particle size and channeling paths, as well as the performance of the gel particles themselves. Especially under harsh environments such as high reservoir temperature, high salinity, and acidic corrosion from supercritical $CO_2$, traditional particle gels struggle to achieve effective plugging, and their effective plugging period is too short, which reduces the economy of geological energy development and underground space utilization technologies.

In addition, the design of traditional gels relies on the empirical trial-and-error method, which has problems such as long cycles, high costs, and difficulty in global optimization. Especially when facing complex reservoir environments with multiple coupled factors such as high temperature, high salinity, and acidic $CO_2$, the nonlinear interactions between components lead to low efficiency in molecular structure design and formula optimization.

In recent years, artificial intelligence (AI) technology has provided a new approach for the efficient design of functional gels by establishing quantitative prediction models of material component-structure-performance. However, existing patents have not yet involved AI-driven directional design methods for temperature-resistant, salt-tolerant, and $CO_2$-responsive gels.

SUMMARY

The object of the present invention is to address the problems that conventional particle gels struggle to withstand the multiple harsh conditions of geological reservoirs, such as high temperature, high salinity, and supercritical $CO_2$ acidic corrosion, and exhibit an excessively short effective plugging period.

To achieve the aforesaid object, a first aspect of the present invention provides a composition for a temperature-resistant and salt-tolerant in-situ plugging-enhanced gel. The composition includes a first monomer, a second monomer, a first crosslinking agent, a second crosslinking agent, an initiator, an enhancer, and water; optionally, the composition further includes a third monomer;

The first monomer is selected from 2-acrylamidomethyl-2-methylpropanesulfonic acid, sodium styrenesulfonate, vinylsulfonic acid, p-styrenesulfonic acid, 4-styrenesulfonic acid, methyl acrylate sulfobutyl ester, acrylic acid hydroxypropylsulfonic acid ester, at least one of these;

The second monomer is selected from N-vinylpyrrolidone, acrylic diethylenaminoethyl ester, methyl acrylate dimethylaminoethyl ester, vinyl imidazole, vinylpyridine, acrylic hydroxyethyl ester, at least one of these;

The third monomer is selected from N-isopropylacrylamide, acrylic hydroxyethyl ester, N-(3-aminopropyl)methylacrylamide, at least one of these;

The first crosslinking agent is selected from polyethyleneimine, borate ester compounds, bisaldehyde cellulose, N,N'-methylenebisacrylamide, polyethylene glycol bisacrylate, at least one of these;

The second crosslinking agent is selected from a second acid-sensitive crosslinking agent and/or a second temperature-sensitive crosslinking agent;

Based on the total weight of the composition, the content of the first monomer is 5 wt %-40 wt %, the content of the second monomer is 5 wt %-30 wt %, the content of the third monomer is 0 wt %-10 wt %, the content of the first crosslinking agent is 0.01 wt %-1 wt %, the content of the second crosslinking agent is 0.01 wt %-1 wt %, the content of the enhancer is 0.01 wt %-10 wt %, the content of the initiator is 0.01 wt %-1 wt %, and the remainder is water.

A second aspect of the present invention provides a method for preparing a temperature-resistant and salt-tolerant in-situ plugging-enhanced gel. The method utilizes the composition according to the first aspect and includes: mixing and contacting the various components of said composition to obtain said gel.

A third aspect of the present invention provides a gel prepared by the method according to the second aspect.

A fourth aspect of the present invention provides a use of the gel according to the third aspect in at least one field selected from the group consisting of oilfield extraction, subterranean $CO_2$ channeling control, and $CO_2$ geological storage.

The temperature-resistant and salt-tolerant in-situ plugging-enhanced gel prepared according to the solution of the present invention can be pre-crosslinked under surface conditions to form gel particles. After being formulated into a suspension with formation water and injected into the reservoir, these particles can accumulate in locations with strong channeling pathways such as fractures, large pores, and fracture-cavity channels. Stimulated by the high temperature and $CO_2$ acidic conditions of the formation, the gel particles undergo re-crosslinking to form the bulk gel.

The solution provided by the present invention avoids issues associated with in-situ gel systems, such as crosslinking uncertainty, chromatographic separation, and susceptibility to reservoir damage, while simultaneously achieving enhanced plugging capability under in-situ reservoir conditions.

BRIEF DESCRIPTION OF THE DRAWINGS

FIG. 1 is a physical photograph of the temperature-resistant and salt-tolerant in-situ plugging-enhanced gel Gel-1.

DETAILED DESCRIPTION OF THE EMBODIMENTS

Figure 2:
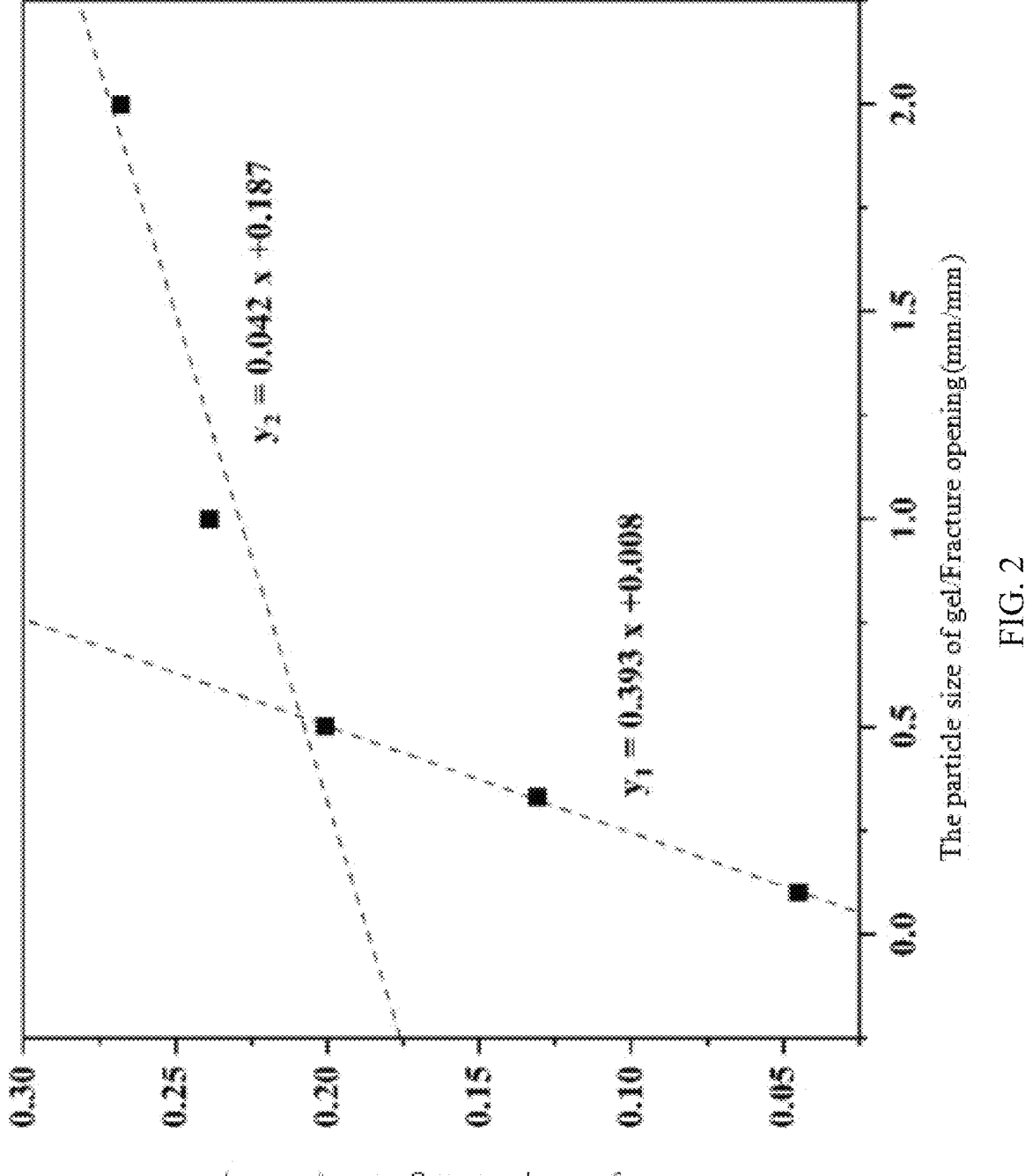
FIG. 2 shows the injectivity test results of the temperature-resistant and salt-tolerant in-situ plugging-enhanced gel Gel-1.

The endpoints and any values of the ranges disclosed herein are not limited to the precise ranges or values, and these ranges or values should be understood to include values close to these ranges or values. For numerical ranges, the endpoint values of the various ranges, the endpoint values of the various ranges and individual point values, as well as individual point values, can be combined with each other to obtain one or more new numerical ranges, which should be considered as specifically disclosed herein.

It is to be noted that, in various aspects of the present invention, for the same components in the various aspects, the present invention describes them only once in one aspect without repetitive description, and those skilled in the art should not construe this as a limitation of the present invention.

As mentioned previously, a first aspect of the present invention provides a composition for a temperature-resistant and salt-tolerant in-situ plugging enhanced gel. Said composition includes a first monomer, a second monomer, a first crosslinking agent, a second crosslinking agent, an initiator, an enhancer, and water; optionally, said composition further includes a third monomer;

Said first monomer is selected from the group consisting of at least one of 2-acrylamido-2-methylpropanesulfonic acid, sodium styrenesulfonate, vinylsulfonic acid, p-styrenesulfonic acid, 4-styrylbenzenesulfonic acid, sulfopropyl methacrylate, and hydroxypropyl sulfonate acrylate;

Said second monomer is selected from the group consisting of at least one of N-vinyl pyrrolidone, diethylaminoethyl acrylate, dimethylaminoethyl methacrylate, vinyl imidazole, vinyl pyridine, and hydroxyethyl methacrylate;

Said third monomer is selected from the group consisting of at least one of N-isopropylacrylamide, hydroxyethyl acrylate, and N-(3-aminopropyl) methacrylamide;

Said first crosslinking agent is selected from the group consisting of at least one of polyethyleneimine, borate ester compounds, dialdehyde cellulose, N,N'-methylenebisacrylamide, and polyethylene glycol diacrylate;

Said second crosslinking agent is selected from a second acid-sensitive crosslinking agent and/or a second temperature-sensitive crosslinking agent;

Based on the total weight of the composition, the content of the first monomer is 5 wt % to 40 wt %, the content of the second monomer is 5 wt % to 30 wt %, the content of the third monomer is 0 wt % to 10 wt %, the content of the first crosslinking agent is 0.01 wt % to 1 wt %, the content of the second crosslinking agent is 0.01 wt % to 1 wt %, the content of the enhancer is 0.01 wt % to 10 wt %, the content of the initiator is 0.01 wt % to 1 wt %, with the balance being water.

Preferably, based on the total weight of the composition, the content of the first monomer is 10 wt % to 35 wt %, the content of the second monomer is 8 wt % to 20 wt %, the content of the third monomer is 0 wt % to 5 wt %, the content of the first crosslinking agent is 0.05 wt % to 0.5 wt %, the content of the second crosslinking agent is 0.05 wt % to 0.5 wt %, the content of the enhancer is 0.05 wt % to 5 wt %, the content of the initiator is 0.05 wt % to 0.5 wt %, with the balance being water.

Preferably, said second acid-sensitive crosslinking agent is selected from the group consisting of at least one of phenylboronic acid pinacol ester, tri-n-butyl borate, triethyl borate, diglycerol borate, and trimethyl borate.

Preferably, said second temperature-sensitive crosslinking agent is selected from the group consisting of at least one of 2-(3,4-epoxycyclohexyl)ethyltrimethoxysilane, hexamethylene diisocyanate-butanone oxime blocked adduct, and bis(trimethylsilyl)aminopropyltriethoxysilane.

According to a particularly preferred embodiment, said first monomer is 2-acrylamido-2-methylpropanesulfonic acid; said second monomer is N-vinyl pyrrolidone and/or dimethylaminoethyl methacrylate; said first crosslinking agent is polyethylene glycol diacrylate; said second crosslinking agent is phenylboronic acid pinacol ester. The inventors of the present invention have found that, under this preferred configuration, after the gel provided by the present invention enters the subterranean reservoir, it can absorb water and swell in the supercritical $CO_2$ acidic environment. The $CO_2$-responsive groups become protonated, converting into positively charged ammonium salts, causing the molecular chains to extend, which promotes gel swelling and exposes crosslinking sites. The inventors believe that the gel provided under the preferred conditions of the present invention may function through the following mechanism: Under acidic conditions, the second crosslinking agent hydrolyzes to release active sites. The free boric acid then re-forms dynamic covalent bonds with the newly exposed vicinal diol groups originating from the polyethylene glycol diacrylate, thereby achieving re-crosslinking and forming an integral bulk structure. This subsequently leads to an enhancement of the plugging capability under in-situ reservoir conditions.

According to a particularly preferred embodiment, said first monomer is 2-acrylamido-2-methylpropanesulfonic acid; said second monomer is N-vinyl pyrrolidone and/or dimethylaminoethyl methacrylate; said third monomer is N-isopropylacrylamide; said first crosslinking agent is polyethylene glycol diacrylate; said second crosslinking agent is 2-(3,4-epoxycyclohexyl)ethyltrimethoxysilane. The inventors of the present invention have found that, under this preferred configuration, after the gel provided by the present invention enters the subterranean reservoir, the 2-(3,4-epoxycyclohexyl)ethyltrimethoxysilane gradually hydrolyzes at high temperature, thereby exposing crosslinking sites.

Concurrently, hydrophilic groups in the polymer chains extend into the aqueous phase, promoting water absorption and swelling.

The inventors believe that the gel provided under the preferred conditions of the present invention may function through the following mechanism: Under high-temperature conditions, the second crosslinking agent hydrolyzes to release active sites. The ring-opened form then reacts with surrounding amino/carboxyl groups, achieving re-crosslinking and forming an integral bulk structure, thereby ultimately enhancing the plugging capability under in-situ reservoir conditions.

The present invention imposes no specific requirements on the weight-average molecular weight of said polyethyleneimine, which may, for example, be 1500-10000 g/mol.

Preferably, said enhancer is a nanoparticle material having an average particle diameter of 10 nm to 500 nm.

More preferably, said enhancer is a nanoparticle material having an average particle diameter of 10 nm to 200 nm. The inventors have found that, under this preferred condition, the mechanical strength of the re-crosslinked plugging gel provided by the present invention is superior.

More preferably, said enhancer is selected from the group consisting of at least one of nano-bentonite, nano-silica, nano-titanium oxide, nano-aluminum oxide, nano-calcium carbonate, carbon nanotubes, and graphene.

Further more preferably, said enhancer is selected from the group consisting of at least one of nano-bentonite, nano-silica, nano-titanium oxide, nano-aluminum oxide, and nano-calcium carbonate.

Preferably, said initiator is selected from the group consisting of at least one of ammonium persulfate, sodium persulfate, potassium persulfate, tetramethylethylenediamine, and azobisisobutyronitrile.

More preferably, said initiator is selected from the group consisting of at least one of ammonium persulfate, potassium persulfate, and sodium persulfate.

The inventors of the present invention have discovered that a gel design method integrated with artificial intelligence can significantly shorten the R&D cycle and guide the discovery of high-performance formulations that are difficult to identify through conventional methods. Said method includes:

(a) constructing a parameterized database including components such as the first monomer, the second monomer, the first crosslinking agent, the second crosslinking agent, the initiator, the enhancer, and water, and collecting their molecular descriptors (e.g., types of functional groups, number of hydrophilic/hydrophobic groups, molecular weight, charge density) and process conditions;

(b) establishing a mapping model between the molecular structures/compositions and gel properties (re-crosslinking time, breakthrough pressure, plugging efficiency) via machine learning algorithms;

(c) searching for an optimal formulation that meets the target performance within the compositional constraint space using optimization algorithms.

As mentioned previously, a second aspect of the present invention provides a method for preparing a temperature-resistant and salt-tolerant in-situ plugging enhanced gel. Said method utilizes the composition according to the first aspect and includes: mixing and contacting the various components of said composition to obtain said gel.

Preferably, the step of performing said mixing and contacting includes:

(1) subjecting the enhancer to ultrasonic dispersion treatment in the presence of water to obtain Solution 1;

(2) performing a first contact between said Solution 1 and a monomer material including the first monomer and the second monomer to obtain Solution 2; wherein said monomer material optionally further includes the third monomer;

(3) sequentially adding the first crosslinking agent, the second crosslinking agent, and the initiator to said Solution 2 to perform a second contact, and subjecting the resulting Solution 3 to a gelation treatment to obtain Intermediate 1;

(4) subjecting said Intermediate 1 to a drying treatment to obtain said gel.

Preferably, in step (1), said ultrasonic dispersion treatment is performed for a duration of 20 min to 60 min.

According to a particularly preferred embodiment, the method further includes, in step (1), purging the water with an inert gas for 10-40 min prior to performing said ultrasonic dispersion treatment, and then performing said ultrasonic dispersion treatment.

Preferably, in step (2), the conditions for said first contact include: a temperature of 20-60° C., a duration of 0.5-3 h, and a stirring speed of 500-1500 rpm.

Preferably, in step (3), the conditions for said second contact include: a temperature of 20-60° C., a duration of 1-6 h, and a stirring speed of 500-1500 rpm; and said gelation treatment is performed at a temperature of 30-90° C. for a duration of 4-24 h. The inventors of the present invention have found that, under these preferred conditions, the in-situ plugging enhanced gel provided by the present invention possesses a three-dimensional network structure and exhibits its favorable water absorption and swelling capacity.

The present invention imposes no specific limitations on the conditions for the gelation treatment in step (3). A person skilled in the art may employ known operations and process conditions in the field, such as, by way of example, carrying it out under static conditions.

Preferably, in step (4), the conditions for the drying treatment include: a temperature of 40-90° C. and a duration of 20-72 h.

According to a particularly preferred embodiment, the method further includes, in step (2), after performing the first contact, adjusting the pH of Solution 2 to 7-8 before proceeding to step (3). The inventors of the present invention have found that, under these preferred conditions, the $CO_2$-responsive groups in the second monomer of the present scheme exist in a non-ionic state in this pH environment. This facilitates the shielding of crosslinking sites, avoids uncertainties in the subterranean crosslinking system, and simultaneously enhances the plugging capability under in-situ reservoir conditions.

Preferably, the method further includes, in step (4), after performing the drying treatment, subjecting the resulting dried product to a grinding treatment to obtain said gel with a particle diameter ranging from 20 nm to 10 mm. The inventors have found that, under this preferred condition, the mineralizable plugging gel provided by the scheme of the present invention exhibits superior $CO_2$ plugging efficiency. Furthermore, the gel synthesis method described in the scheme of the present invention is a one-pot process; the bulk gel obtained after synthesis is difficult to reduce to the nanoscale through mechanical grinding alone. However, under identical synthesis conditions, employing a reverse-phase microemulsion method and optimizing the particle size by controlling the water-to-oil ratio enables the synthesis of gel particles at the nanoscale (with a minimum achievable size of 20 nm). The present invention imposes no specific requirements on the conditions for said reverse-phase microemulsion method, which can be performed, for example, by referring to the method described in Energy & Fuels, 2018, *32*(3), 3068-3076 (DOI: 10.1021/acs.energyfuels.7b03649).

As mentioned previously, a third aspect of the present invention provides a gel prepared according to the second aspect.

As mentioned previously, a fourth aspect of the present invention provides the use of the gel according to the third aspect in at least one application selected from the group consisting of the field of oilfield production, the field of subterranean $CO_2$ conformance control, and the field of $CO_2$ geological storage.

The present invention will be described in detail below through examples. In the following examples, unless otherwise specified, all instruments and raw materials used are commercially available products.

First Monomer I: 2-Acrylamido-2-methylpropanesulfonic acid, purchased from Shanghai Jizhi Biochemical Technology Co., Ltd., Catalog No. TCI-A0926-100G.

First Monomer II: Sodium Styrenesulfonate (SSS), purchased from Beijing Huawei Ruike Chemical Technology Co., Ltd., Catalog No. HWG00338.

Second Monomer I: N-Vinyl Pyrrolidone, purchased from Shanghai Jizhi Biochemical Technology Co., Ltd., Catalog No. V20730.

Second Monomer II: Dimethylaminoethyl Methacrylate, purchased from Beijing Innochem Science & Technology Co., Ltd., Catalog No. R004180.

Third Monomer: N-Isopropylacrylamide, purchased from Beijing Innochem Science & Technology Co., Ltd., Catalog No. T77704.

First crosslinking agent: Poly(ethylene glycol) diacrylate (PEGDA), purchased from Shanghai Titan Technology Co., Ltd., Catalog No. P17544.

Second acid-sensitive crosslinking agent: Phenylboronic acid pinacol ester, purchased from Shanghai Titan Technology Co., Ltd., Catalog No. GC37247.

Second temperature-sensitive crosslinking agent: 2-(3,4-Epoxycyclohexyl)ethyltrimethoxysilane, purchased from Beijing XBHA Chemical Co., Ltd., Catalog No. E156231.

Initiator: Ammonium persulfate.

Enhancer I: Nano-silica, average particle diameter 20 nm, purchased from Beijing Innochem Science & Technology Co., Ltd.

Enhancer II: Nano-silica, average particle diameter 500 nm, purchased from Shanghai Macklin Biochemical Technology Co., Ltd.

Room temperature or ambient temperature mentioned in this text refers to 25±2° C.

Example 1

(1) First, pass nitrogen gas into water for 30 minutes, then add an enhancer and perform ultrasonic dispersion treatment for 30 minutes to obtain Solution 1;

(2) At 40° C., add a monomer material containing Monomer I-1 and Monomer I-2 to Solution 1 for the first contact, then adjust the pH value with 40% NaOH to obtain Solution 2 with a pH of 7.5; the stirring speed for the first contact is 1200 rpm, and the stirring time is 2 hours;

(3) At 40° C., sequentially add the first crosslinking agent, the second crosslinking agent, and the initiator to Solution 2 for the second contact; the stirring speed for the second contact is 1200 rpm, and the stirring time is 2 hours; then subject the obtained Solution 3 to gel-forming treatment to obtain Intermediate 1, where the gel-forming treatment is conducted by standing at 40° C. for 12 hours; (4) Dry Intermediate 1 at 80° C. for 24 hours, then perform crushing treatment to obtain the temperature-resistant, salt-tolerant in-situ plugging enhanced gel, named Gel-1, with an average particle diameter of 100 μm.

The remaining specific process parameters of this example are shown in Table 1.

FIG. 1 is a physical photograph of the temperature-resistant, salt-tolerant in-situ plugging enhanced gel Gel-1, where 1 represents the bulk integral gel and 2 represents the crushed gel particles.

Example 2

The same process as Example 1 was adopted, with the difference that the monomer material further contained a third monomer (N-isopropylacrylamide); all other steps were the same as Example 1, and a particle gel was obtained, named Gel-2.

The remaining specific process parameters of this example are shown in Table 1.

Examples 3-7

The same process as Example 1 was adopted, with the differences in raw material types/amounts or process parameters; details are shown in Table 1, and temperature-resistant, salt-tolerant in-situ plugging enhanced gels were obtained.

Example 8

The same process as Example 1 was adopted, with the difference that the amounts of raw materials were obtained through the following method:

Collect the formula data and performance indicators of Examples 1-7 and Comparative Example 1 (Tables 2 and 3), and extract the following features: monomer type, content, number of crosslinking agent functional groups, enhancer particle size, and process parameters (temperature, time);

Use a random forest algorithm to train a prediction model with re-crosslinking time, $CO_2$ breakthrough pressure, and plugging rate as output targets, and set optimization objectives: re-crosslinking time ≤5 h at 150° C., breakthrough pressure ≥6.0 MPa/m, and plugging rate ≥99%;

Search within the component range of Claim 1 using a genetic algorithm to obtain the optimized formula.

The remaining specific process parameters of this example are shown in Table 1.

TABLE 1

| | case 1 | case 2 | case 3 | case 4 | case 5 | case 6 | case 7 | case 8 |
|---|---|---|---|---|---|---|---|---|
| enhancer | | | | | | | | |
| Type | Agent I | Agent I | Agent I | Agent I | Agent I | Agent I | Agent II | Agent I |
| Dosage/g | 2.5 | 2.5 | 2.5 | 2.5 | 2.5 | 2.5 | 2.5 | 4 |
| The first monomer | | | | | | | | |
| Type | M1 I | M1 I | M1 I + M1II | M1II | M1I | M1I | M1I | M1I |
| Dosage/g | 30 | 30 | 15 + 15 | 30 | 30 | 30 | 30 | 28 |
| The second monomer | | | | | | | | |
| Type | M2 I | M2 I | M2 I | M2 II | M2 I | M2 I | M2 I | M2 I |
| Dosage/g | 10 | 10 | 10 | 10 | 10 | 10 | 10 | 12 |
| The third monomer | | | | | | | | |
| Type | / | NIPAM | / | / | / | / | / | / |
| Dosage/g | 0 | 5 | 0 | 0 | 0 | 0 | 0 | 0 |
| The first contact | | | | | | | | |
| T/° C. | 40 | 40 | 40 | 40 | 40 | 40 | 40 | 40 |
| RPM /rpm | 1200 | 1200 | 800 | 1200 | 1200 | 1200 | 1200 | 1200 |
| Time/h | 2 | 2 | 2 | 2 | 2 | 2 | 2 | 2 |
| the first crosslinking agent | | | | | | | | |
| Type | PEGDA | PEGDA | PEGDA | PEGDA | PEGDA | PEGDA | PEGDA | PEGDA |
| Dosage/g | 0.1 | 0.1 | 0.1 | 0.1 | 0.2 | 0.1 | 0.1 | 0.08 |
| The second crosslinking agent | | | | | | | | |
| Type | Ph-BPin | ECETS | Ph-BPin | Ph-BPin | Ph-BPin | Ph-BPin | Ph-BPin | Ph-BPin |
| Dosage/g | 0.2 | 0.2 | 0.2 | 0.2 | 0.1 | 0.2 | 0.2 | 0.15 |
| Initiator | | | | | | | | |
| Type | APS | APS | APS | APS | APS | APS | APS | APS |
| Dosage/g | 0.2 | 0.2 | 0.2 | 0.2 | 0.2 | 0.2 | 0.2 | 0.2 |
| Water | | | | | | | | |
| Dosage/g | 57 | 52 | 57 | 57 | 57 | 57 | 57 | 55.57 |
| The second contact | | | | | | | | |
| Temperature/° C. | 40 | 40 | 40 | 40 | 40 | 40 | 40 | 40 |

TABLE 1-continued

| | case 1 | case 2 | case 3 | case 4 | case 5 | case 6 | case 7 | case 8 |
|---|---|---|---|---|---|---|---|---|
| RPM /rpm | 1200 | 1200 | 800 | 1200 | 1200 | 1200 | 1200 | 1200 |
| Time/h | 2 | 2 | 4 | 2 | 2 | 2 | 2 | 2 |
| | | | | gel-forming treatment | | | | |
| T/° C. | 40 | 40 | 40 | 40 | 40 | 60 | 40 | 40 |
| Time/h | 12 | 12 | 12 | 12 | 12 | 6 | 12 | 12 |
| | | | | Drying treatment | | | | |
| T/° C. | 80 | 80 | 80 | 80 | 80 | 80 | 80 | 80 |
| Time/h | 24 | 24 | 24 | 24 | 24 | 24 | 24 | 24 |
| name | Gel-1 | Gel-2 | Gel-3 | Gel-4 | Gel-5 | Gel-6 | Gel-7 | Gel-AI |

Comparative Example 1

This comparative example was carried out using a method similar to that of Example 1, with the difference that in step (3), 0.3 g of the first crosslinking agent was added without adding the second crosslinking agent, and the temperature for gel-forming treatment after the second contact was increased to 80° C. All other steps were the same as in Example 1, and a granular gel was obtained, named KN-1.

Comparative Example 2

This comparative example was carried out using a method similar to that of Example 1, with the difference that in step (3), 0.3 g of the second crosslinking agent was added without adding the first crosslinking agent. All other steps were the same as in Example 1. The product prepared by this method failed to form a gel.

Test Example 1

Comparison of recrosslinking time: Using a high-precision electronic balance, 5 g of gel particles provided in Examples 1 to 7 were weighed respectively, placed in beakers containing the same volume of 10 wt % NaCl, and sealed with plastic wrap;

The beakers containing the gel samples were placed in a constant temperature incubator at 150° C., with this moment recorded as $t_0$.

The time $t_1$ when weak crosslinking occurred between gel particles and the time $t_2$ when the boundaries between particles disappeared were recorded. Table 2 shows the recrosslinking times of the temperature-resistant, salt-tolerant in-situ plugging reinforced gels Gel-1 to Gel-7 at 50° C., 100° C., and 150° C.

It can be seen from Table 2 that increasing temperature helps to shorten the recrosslinking time; at the same temperature, Gel-1 has the shortest recrosslinking time; when the particle diameter of the enhancer is too large, the sensitivity of the recrosslinking reaction to temperature is reduced, and the difference in recrosslinking time under different temperatures becomes smaller; the recrosslinking time of Gel-AI at 50° C. is 3.1 h, which is close to the predicted value (3 h).

TABLE 2

| | Temperature/° C. | $t_1$ | $t_2$ | recrosslinking time |
|---|---|---|---|---|
| Gel-1 | 50 | 8.8 | 12.2 | 3.4 |
| | 100 | 7 | 10 | 3 |
| | 150 | 6 | 8.5 | 2.5 |

TABLE 2-continued

| | Temperature/° C. | $t_1$ | $t_2$ | recrosslinking time |
|---|---|---|---|---|
| Gel-2 | 50 | No recrosslinking occurred | | |
| | 100 | 9.2 | 14.5 | 5.3 |
| | 150 | 6.5 | 10.5 | 4 |
| Gel-3 | 50 | 9.5 | 13.5 | 4 |
| | 100 | 8.2 | 12 | 3.8 |
| | 150 | 7.2 | 10.5 | 3.3 |
| Gel-4 | 50 | 9.3 | 13.2 | 3.9 |
| | 100 | 7.8 | 11.3 | 3.5 |
| | 150 | 6.8 | 10 | 3.2 |
| Gel-5 | 50 | 8.3 | 13.5 | 5.2 |
| | 100 | 7.5 | 12.2 | 4.7 |
| | 150 | 6.6 | 11 | 4.4 |
| Gel-6 | 50 | 9 | 12.8 | 3.8 |
| | 100 | 7.2 | 10.8 | 3.6 |
| | 150 | 6.4 | 9.5 | 3.1 |
| Gel-7 | 50 | 9.2 | 12.8 | 3.6 |
| | 100 | 7 | 10.6 | 3.6 |
| | 150 | 6.4 | 9.8 | 3.4 |

Test Example 2

Injectivity Test: This invention exemplarily provides the test results of the in-situ plugging reinforced gel in Example 1.

Experimental Equipment: High-temperature and high-pressure core displacement device.

Experimental Material: The in-situ plugging reinforced gel provided in Example 1 (with a particle diameter of 80-100 mesh, i.e., 150-177 μm).

Test Steps:

1) Using a high-precision electronic balance, weigh 10 g of gel particles, place them in a 1 L beaker filled with 10 wt % NaCl for swelling, let stand at room temperature for 24 hours, take out the swollen gel particles, and remove surface free water;

2) Place the treated granular gel in an intermediate container;

3) Prepare fractured cores with different fracture openings, including 0.1 mm, 0.3 mm, 0.5 mm, 1 mm, and 2 mm, and place the fractured cores in the core holder;

4) Turn on the constant temperature system of the experimental device and control the experimental temperature at 150° C.;

5) Turn on the constant-speed and constant-pressure pump, inject the swollen gel particles from the intermediate container into the fractured core at a constant speed of 0.5 mL/min until particles are produced and the injection pressure reaches equilibrium, and record the pressure gradient during the gel injection process respectively.

FIG. 2 shows the injectivity test results of the temperature-resistant and salt-tolerant in-situ plugging reinforced gel Gel-1. It can be seen from FIG. 2 that Gel-1 has good injectability, and during the injection process, the gel particles do not undergo obvious recrosslinking, which would otherwise reduce the injectability.

Test Example 3

$CO_2$ Breakthrough Pressure Test: Experimental Equipment and Materials: Same as those in Test Example 2. Test Steps:

1) Using a high-precision electronic balance, weigh 10 g of granular gel, place it in a 1 L beaker filled with 1 wt % NaCl for swelling, let stand at room temperature for 24 hours, take out the swollen gel particles, and remove surface free water;
2) Place the treated granular gel in the core holder;
3) Turn on the constant-speed and constant-pressure pump, inject the swollen gel particles from the intermediate container into the fractured core at a constant speed of 0.5 mL/min until particles are produced and the injection pressure reaches equilibrium;
4) Raise the device temperature to 150° C., inject 0.1 fracture volume (FPV) of $CO_2$ to allow recrosslinking of the gel particles in the fracture, with the recrosslinking time referring to Table 2;
5) After the gel particles are completely crosslinked, conduct a displacement experiment with $CO_2$;
6) Adopt the constant pressure mode, inject $CO_2$ at a constant pressure of 0.05 MPa, and place the outlet pipeline in an aqueous solution to observe whether $CO_2$ breaks through. Specifically, when bubbles are produced, it indicates that $CO_2$ has broken through. If no bubbles are produced at the outlet after 5 minutes, increase the $CO_2$ injection pressure by 0.05 MPa each time until bubbles appear at the outlet.

Table 3 shows the $CO_2$ breakthrough pressure test results of the temperature-resistant and salt-tolerant in-situ plugging reinforced gels Gel-1 to Gel-7 and KN-1. It can be seen from Table 3 that compared with KN-1 which has no recrosslinking ability, once Gel-1 to Gel-7 undergo recrosslinking reaction, the gel particles adhere to each other, resulting in good plugging tightness; the $CO_2$ breakthrough pressure of Gel-AI is 6.7 MPa/m, which is close to the predicted value (6.8 MPa/m).

TABLE 3

| | $CO_2$ breaking pressure, MPa/m |
|---|---|
| Gel-1 | 6.5 |
| Gel-2 | 6.0 |
| Gel-3 | 6.2 |
| Gel-4 | 5.8 |
| Gel-5 | 5.2 |
| Gel-6 | 6.4 |
| Gel-7 | 4.8 |
| Gel-AI | 6.7 |
| KN-1 | 2.4 |

Test Example 4

Plugging Performance Test: After the completion of Test Example 3, the ability of the gel to plug $CO_2$ under high-temperature and high-pressure conditions was further verified.

Experimental Equipment and Materials: Same as those in Test Example 3.
Test Steps:

1) Set the back pressure to 30 MPa and control the experimental temperature above 150° C.
2) Inject $CO_2$ into the plugged fractured core at a constant speed of 0.5 mL/min, and record the pressure values at both ends of the fractured core during $CO_2$ injection.
3) After the pressure at both ends of the core stabilizes, stop $CO_2$ injection, maintain the high-temperature and high-pressure $CO_2$ conditions, and allow the gel in the fracture to undergo recrosslinking, with the recrosslinking time referring to Table 2.
4) Resume $CO_2$ injection at a constant speed (0.5 mL/min) and record the pressure values at both ends of the core.
5) Calculate the fracture plugging rate of the gel before and after recrosslinking using formulas (1) and (2).

$$F_{rr} = \frac{K_{pregel}}{K_{postgel}} = \frac{\Delta P_{postgel}}{\Delta P_{prefel}} \tag{1}$$

$$E_p = \left(1 - \frac{1}{F_{rr}}\right) \times 100\% \tag{2}$$

In the formulas, Fr is the residual resistance factor, dimensionless; $K_{pregel}$ is the permeability before gel injection, in Darcy (D); $K_{postgel}$ is the permeability after gel injection, in Darcy (D); $\Delta P_{postgel}$ is the pressure difference across the core after gel injection, in MPa; $\Delta P_{pregel}$ is the pressure difference across the core before gel injection, in MPa; Ep is the gel plugging efficiency.

Calculations using formulas (1) and (2) show that the fracture plugging rates of the temperature-resistant, salt-tolerant in-situ plugging reinforced gel Gel-1 before and after recrosslinking are 85.5% and 99.9% respectively. This indicates that the gel exhibits in-situ self-enhancing plugging performance under high-temperature (150° C.) and acidic $CO_2$ (pH 1.5-2) environments. The post-recrosslinking plugging efficiency of Gel-AI is 99.98%, which is close to the predicted value (99.99%).

The above provides a detailed description of the preferred embodiments of the present invention; however, the present invention is not limited thereto. Within the scope of the technical concept of the present invention, various simple modifications can be made to the technical solutions of the present invention, including combining the respective technical features in any other appropriate manner. These simple modifications and combinations shall also be regarded as the content disclosed by the present invention and all fall within the protection scope of the present invention.

What is claimed is:

1. A composition for a temperature-resistant and salt-tolerant in-situ plugging-enhanced gel, wherein the composition comprises a first monomer, a second monomer, a first crosslinking agent, a second crosslinking agent, an initiator, an enhancer, and water; optionally, the composition further comprises a third monomer;

the first monomer is selected from at least one of 2-acrylamidomethyl-2-methylpropanesulfonic acid, sodium styrenesulfonate, vinylsulfonic acid, p-styrenesulfonic acid, 4-styrenesulfonic acid, methyl acrylate sulfobutyl ester, and acrylic acid hydroxypropylsulfonic acid ester;

the second monomer is selected from at least one of N-vinylpyrrolidone, acrylic diethylenaminoethyl ester, methyl acrylate dimethylaminoethyl ester, vinyl imidazole, vinylpyridine, and acrylic hydroxyethyl ester;

the third monomer is selected from at least one of N-isopropylacrylamide, acrylic hydroxyethyl ester, and N-(3-aminopropyl)methylacrylamide;

the first crosslinking agent is polyethylene glycol bisacrylate;

the second crosslinking agent is selected from a second acid-sensitive crosslinking agent and/or a second temperature-sensitive crosslinking agent;

the second acid-sensitive crosslinking agent is selected from at least one of benzylboronic acid phenyl ether, boronic acid tributyl ester, boronic acid triethyl ester, boronic acid diglyceride, and boronic acid trimethyl ester;

the second temperature-sensitive crosslinking agent is selected from at least one of 2-(3,4-epoxycyclohexyl) ethyl trimethoxysilane, hexamethylene diisocyanate-butyrolactone end-capped compound, and bis(tri methylsilyl)amino propyl triethoxysilane; and based on a total weight of the composition, a content of the first monomer is 5 wt %-40 wt %, a content of the second monomer is 5 wt %-30 wt %, a content of the third monomer is 0 wt %-10 wt %, a content of the first crosslinking agent is 0.01 wt %-1 wt %, a content of the second crosslinking agent is 0.01 wt %-1 wt %, a content of the enhancer is 0.01 wt %-10 wt %, a content of the initiator is 0.01 wt %-1 wt %, and a remainder is the water.

2. The composition according to claim 1, wherein based on the total weight of the composition, the content of the first monomer is 10 wt %-35 wt %, the content of the second monomer is 8 wt %-20 wt %, the content of the third monomer is 0 wt %-5 wt %, the content of the first crosslinking agent is 0.05 wt %-0.5 wt %, the content of the second crosslinking agent is 0.05 wt %-0.5 wt %, the content of the enhancer is 0.05 wt %-5 wt %, the content of the initiator is 0.05 wt %-0.5 wt %, and the remainder is the water.

3. The composition according to claim 1, wherein the enhancer is a nanoparticle material having an average particle diameter of 10 nm-200 nm;

and/or, the enhancer is selected from at least one of nano-bentonite, nano-silica, nano-titanium oxide, nano-aluminum oxide, nano-calcium carbonate, carbon nanotubes, and graphene.

4. The composition according to claim 3, wherein the initiator is selected from at least one of ammonium per sulfate, sodium per sulfate, potassium per sulfate, tetramethyl ethylenediamine, and azobis(isobutyronitrile).

5. A method for preparing a temperature-resistant and salt-tolerant in-situ plugging-enhanced gel, wherein the method uses the composition according to claim 1, and comprises: mixing and contacting various components of the composition to obtain the gel.

6. The method according to claim 5, wherein a step of performing the mixing and the contacting comprises:

(1) in presence of the water, subjecting the enhancer to ultrasonic dispersion treatment to obtain solution 1;

(2) performing a first contact between the solution 1 and a monomer material containing the first monomer and the second monomer to obtain solution 2; and the monomer material optionally further containing the third monomer;

(3) sequentially adding the first crosslinking agent, the second crosslinking agent, and the initiator to the solution 2 to perform a second contact, and subjecting resulting solution 3 to gelation treatment to obtain intermediate product 1; and (4) subjecting the intermediate product 1 to drying treatment to obtain the gel.

7. The method according to claim 6, wherein in step (1), a time for the ultrasonic dispersion treatment is 20 min-60 min;

and/or, in step (2), conditions for the first contact comprise: a temperature of 20-60° C., a time of 0.5-3 h, and a stirring speed of 500-1500 rpm;

and/or, in step (3), conditions for the second contact comprise: a temperature of 20-60° C., a time of 1-6 h, and a stirring speed of 500-1500 rpm; and conditions for the gelation treatment comprise: a temperature of 30-90° C. and a time of 4-24 h; and and/or, in step (4), conditions for the drying treatment comprise: a temperature of 40-90° C. and a time of 20-72 h.

8. The method according to claim 6, wherein the method further comprises, in step (2), after performing the first contact, first adjusting a pH value of the solution 2 to 7-8, and then performing step (3).

9. A gel prepared by the method according to claim 5.

10. A use of the gel according to claim 9 in at least one field selected from the group consisting of oilfield extraction, subterranean $CO_2$ channeling control, and $CO_2$ geological storage.

11. The gel according to claim 9, wherein in the method, a step of performing the mixing and the contacting comprises:

(1) in presence of the water, subjecting the enhancer to ultrasonic dispersion treatment to obtain solution 1;

(2) performing a first contact between the solution 1 and a monomer material containing the first monomer and the second monomer to obtain solution 2; and the monomer material optionally further containing the third monomer;

(3) sequentially adding the first crosslinking agent, the second crosslinking agent, and the initiator to the solution 2 to perform a second contact, and subjecting resulting solution 3 to gelation treatment to obtain intermediate product 1; and (4) subjecting the intermediate product 1 to drying treatment to obtain the gel.

12. The gel according to claim 11, wherein in the method, in step (1), a time for the ultrasonic dispersion treatment is 20 min-60 min;

and/or, in step (2), conditions for the first contact comprise: a temperature of 20-60° C., a time of 0.5-3 h, and a stirring speed of 500-1500 rpm;

and/or, in step (3), conditions for the second contact comprise: a temperature of 20-60° C., a time of 1-6 h, and a stirring speed of 500-1500 rpm; and conditions for the gelation treatment comprise: a temperature of 30-90° C. and a time of 4-24 h; and and/or, in step (4), conditions for the drying treatment comprise: a temperature of 40-90° C. and a time of 20-72 h.

13. The gel according to claim 11, wherein in the method, the method further comprises, in step (2), after performing the first contact, first adjusting a pH value of the solution 2 to 7-8, and then performing step (3).

14. The method according to claim 5, wherein in the composition, based on the total weight of the composition, the content of the first monomer is 10 wt %-35 wt %, the content of the second monomer is 8 wt %-20 wt %, the content of the third monomer is 0 wt %-5 wt %, the content of the first crosslinking agent is 0.05 wt %-0.5 wt %, the content of the second crosslinking agent is 0.05 wt %-0.5 wt %, the content of the enhancer is 0.05 wt %-5 wt %, the content of the initiator is 0.05 wt %-0.5 wt %, and the remainder is the water.

15. The method according to claim 5, wherein in the composition, the enhancer is a nanoparticle material having an average particle diameter of 10 nm-200 nm;

and/or, the enhancer is selected from at least one of nano-bentonite, nano-silica, nano-titanium oxide, nano-aluminum oxide, nano-calcium carbonate, carbon nanotubes, and graphene.

16. The method according to claim 15, wherein in the composition, the initiator is selected from at least one of ammonium per sulfate, sodium per sulfate, potassium per sulfate, tetramethyl ethylenediamine, and azobis(isobutyronitrile).

\* \* \* \* \*